United States Patent
Lee et al.

(10) Patent No.: US 12,362,389 B2
(45) Date of Patent: Jul. 15, 2025

(54) ELECTROLYTE SOLUTION FOR LITHIUM SECONDARY BATTERY AND LITHIUM SECONDARY BATTERY INCLUDING SAME

(71) Applicants: Hyundai Motor Company, Seoul (KR); Kia Corporation, Seoul (KR); UNIST (Ulsan National Institute of Science and Technology), Ulsan (KR)

(72) Inventors: Yoon Sung Lee, Suwon-si (KR); Jun Ki Rhee, Suwon-si (KR); Ko Eun Kim, Cheongju-si (KR); Sung Ho Ban, Hwaseong-si (KR); Seung Min Oh, Incheon (KR); Nam Soon Choi, Ulsan (KR); Sung You Hong, Ulsan (KR); Sang Kyu Kwak, Ulsan (KR); Hyeon Gyu Moon, Ulsan (KR); Hyeong Jun Kim, Ulsan (KR); Min Ho Jeon, Ulsan (KR)

(73) Assignees: HYUNDAI MOTOR COMPANY, Seoul (KR); KIA CORPORATION, Seoul (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 524 days.

(21) Appl. No.: 17/813,470

(22) Filed: Jul. 19, 2022

(65) Prior Publication Data

US 2023/0207874 A1 Jun. 29, 2023

(30) Foreign Application Priority Data

Dec. 29, 2021 (KR) ........................ 10-2021-0191209

(51) Int. Cl.
*H01M 10/0567* (2010.01)
*H01M 4/525* (2010.01)
(Continued)

(52) U.S. Cl.
CPC ....... *H01M 10/0567* (2013.01); *H01M 4/525* (2013.01); *H01M 4/583* (2013.01);
(Continued)

(58) Field of Classification Search
CPC ......... H01M 10/0567; H01M 10/0568; H01M 10/0569; H01M 2300/0025;
(Continued)

(56) References Cited

U.S. PATENT DOCUMENTS

| | | | |
|---|---|---|---|
| 5,206,323 A | 4/1993 | Hays | |
| 2019/0152902 A1 | 5/2019 | Krawczyk | |

FOREIGN PATENT DOCUMENTS

| | | | |
|---|---|---|---|
| JP | 2000169715 A | 6/2000 | |
| JP | 2001316394 A | 11/2001 | |

(Continued)

*Primary Examiner* — Laura Weiner
(74) *Attorney, Agent, or Firm* — MCDONNELL BOEHNEN HULBERT & BERGHOFF LLP (57) ABSTRACT

The present disclosure provides an electrolyte for a lithium secondary battery capable of improving the lifespan characteristics and output characteristics of a high capacity lithium secondary battery and a lithium secondary battery including the same. The electrolyte for a lithium secondary battery, according to an embodiment of the present disclosure, is an electrolyte for a lithium secondary battery including a lithium salt, a solvent, and a functional additive agent, in which the functional additive agent includes a cathode film additive agent, (4-allyl-2-methoxyphenoxy) trimethylsilane, represented by the following formula:

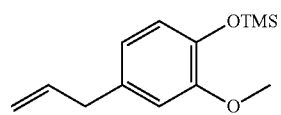

11 Claims, 6 Drawing Sheets (51) Int. Cl.
*H01M 4/583* (2010.01)
*H01M 4/587* (2010.01)
*H01M 10/0568* (2010.01)
*H01M 10/0569* (2010.01)
*H01M 10/0525* (2010.01)

(52) U.S. Cl.
CPC ....... *H01M 4/587* (2013.01); *H01M 10/0568* (2013.01); *H01M 10/0569* (2013.01); *H01M 10/0525* (2013.01); H01M 2300/0025 (2013.01); H01M 2300/0037 (2013.01); H01M 2300/004 (2013.01)

(58) Field of Classification Search
CPC ... H01M 2300/0037; H01M 2300/004; H01M 4/525; H01M 4/587; H01M 10/0525
See application file for complete search history.

(56) References Cited

FOREIGN PATENT DOCUMENTS

| | | |
|---|---|---|
| KR | 100789718 B1 | 1/2008 |
| KR | 101437073 B1 | 2/2014 |
| KR | 20190092149 A | 8/2019 |
| WO | 199204357 | 3/1992 |

ELECTROLYTE SOLUTION FOR LITHIUM SECONDARY BATTERY AND LITHIUM SECONDARY BATTERY INCLUDING SAME

CROSS REFERENCE TO RELATED APPLICATIONS

The present application claims priority to Korean Patent Application No. 10-2021-0191209, filed Dec. 29, 2021, the entire contents of which is incorporated herein for all purposes by this reference.

TECHNICAL FIELD

The present disclosure relates to an electrolyte for a lithium secondary battery and a lithium secondary battery including the same. More particularly, the present disclosure relates to an electrolyte for a lithium secondary battery capable of improving the lifespan characteristics and output characteristics of a high-capacity lithium secondary battery and to a lithium secondary battery including the same.

BACKGROUND

A lithium secondary battery is an energy storage device composed of a cathode electrode that provides lithium ions during charging, an anode electrode that receives the lithium ions, an electrolyte that is a lithium-ion transmission medium, and a separator that separates the cathode and anode electrodes from each other. Electrical energy is generated and stored by a change in a chemical potential when lithium ions are intercalated/deintercalated in the cathode and the anode.

Such a lithium secondary battery has been mainly used in portable electronic devices, but recently, as electric vehicles (EVs) and hybrid electric vehicles (HEVs) have been commercialized, lithium secondary batteries have also been used as an energy storage means for electric vehicles and hybrid electric vehicles.

However, research has been conducted to increase the energy density of a lithium secondary battery to increase the driving distance of an electric vehicle, and the increase in the energy density of the lithium secondary battery is possible through the high capacity of the cathode.

In order to develop a lithium secondary battery with high energy density, it is required to develop a new material capable of overcoming performance limitations of existing materials for lithium secondary batteries such as cathode, anode, separator, and electrolyte.

In particular, the energy density of the battery largely depends on the characteristics of the cathode and anode materials, and suitable electrolyte development must be accompanied in order for the developed cathode and anode materials to exhibit excellent electrochemical performance.

In the layered nickel(Ni)-rich $LiNi_{1-x-y}Co_xMn_yO_2$ (NCM: 1-x-y≥0.6) oxide, which is a high-capacity cathode active material, the cathode capacity may be increased by increasing Ni content or by increasing the charging voltage, but the residual lithium ($Li_2CO_3$ and LiOH) components present on the surface of the cathode promote electrolyte decomposition and increase interface reactivity with the electrolyte, thereby also increasing a degradation rate, thereby quickly degrading charging and discharging performance.

Therefore, interface control technology between cathode and electrolyte is very important, and to this end, it is required to introduce additive technology capable of forming electrochemical and chemically stable films.

The description as the background technology is intended to understand the background of the present disclosure and to recognize that it corresponds to the related art that is already known to those skilled in the art.

SUMMARY

The present disclosure provides an electrolyte for a lithium secondary battery capable of improving the lifespan characteristics and output characteristics of a lithium secondary battery, and a lithium secondary battery including the same.

The description as the background technology is intended to understand the background of the present disclosure and to recognize that it corresponds to the related art that is already known to those skilled in the art.

The electrolyte for a lithium secondary battery, according to an embodiment of the present disclosure, is an electrolyte for a lithium secondary battery including a lithium salt, a solvent, and a functional additive agent, in which the functional additive agent includes a cathode film additive agent (4-allyl-2-methoxyphenoxy) trimethylsilane, represented by the following [Formula 1].

[Formula 1]

The cathode film additive agent is included in an amount of 0.1 wt % to 1.0 wt % based on the weight of the electrolyte.

In particular, the cathode film additive agent is included more preferably in an amount of 0.1 wt % to 0.5 wt % based on the weight of the electrolyte.

The functional additive agent may further include an anode film additive agent that is vinylene carbonate (VC).

The vinylene carbonate (VC) may be added in an amount of 0.5 wt % to 3.0 wt % based on the weight of the electrolyte.

The functional additive agent further includes $LiPO_2F_2$ as the anode film additive agent.

The $LiPO_2F_2$ may be added in an amount of 0.1 wt % to 2.0 wt % based on the weight of the electrolyte.

The lithium salt may be one or a mixture of two or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI), and $(CF_3SO_2)_2NLi$.

The solvent may be one or a mixture of two or more selected from the group consisting of a carbonate-based solvent, an ester-based solvent, an ether-based solvent, or a ketone-based solvent.

On the other hand, the lithium secondary battery, according to an embodiment of the present disclosure, includes the above-described electrolyte. The lithium secondary battery further includes: a cathode including a cathode active material composed of Ni, Co, and Mn; an anode including one or more anode active materials selected from carbon (C)-based or silicon (Si)-based materials; a separator interposed between the cathode and the anode.

The cathode is characterized in that the Ni content is 80 wt % or more.

According to an embodiment of the present disclosure, an effect of suppressing cell degradation by forming a protective layer on the surface of the cathode active material by the electrolyte can be expected to increase the life of the lithium secondary battery.

In addition, it is possible to improve battery marketability by ensuring lifespan stability at high temperatures.

DETAILED DESCRIPTION

Hereinafter, embodiments of the present disclosure will be described in more detail with reference to the accompanying drawings. However, the present disclosure is not limited to the embodiments disclosed below but will be implemented in various different forms, and only the present embodiments are provided to ensure that the disclosure of the present disclosure is complete and to fully inform those skilled in the art.

According to an embodiment of the present disclosure, the electrolyte for a lithium secondary battery is a material forming an electrolyte applied to a lithium secondary battery and includes a lithium salt, a solvent, and a functional additive agent.

The lithium salt may be one or a mixture of two or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI), and $(CF_3SO_2)_2NLi$.

In this case, the lithium salt may be present in the electrolyte in a concentration of 0.1 mol to 3.0 mol, preferably 0.1 mol to 1.2 mol.

In addition, the solvent may use one or a mixture of two or more selected from the group consisting of a carbonate-based solvent, an ester-based solvent, an ether-based solvent, or a ketone-based solvent.

At this time, the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), fluoroethylene carbonate (FEC), vinylene carbonate (VC), and the like. In addition, the ester-based solvent may include γ-butyrolactone (GBL), n-methyl acetate, n-ethyl acetate, n-propyl acetate, etc., and as the ether-based solvent, dibutyl ether, or the like may be used but is not limited thereto.

In addition, the solvent may further include an aromatic hydrocarbon-based organic solvent. Specific examples of the aromatic hydrocarbon-based organic solvent may include benzene, fluorobenzene, bromobenzene, chlorobenzene, cyclohexylbenzene, isopropylbenzene, n-butylbenzene, octylbenzene, toluene, xylene, mesitylene, and the like, and may be used alone or in combination.

On the other hand, as a functional additive agent added to the electrolyte according to an embodiment of the present disclosure, a cathode film additive agent of (4-allyl-2-methoxyphenoxy)trimethylsilane (hereinafter referred to as "MH-162") is represented by the following [Formula 1] may be used.

[Formula 1]

At this time, the cathode film additive agent has low LUMO and high HOMO when comparing HOMO and LUMO energy levels through DFT calculation, so the cathode film additive agent is decomposed first on the surface of the cathode and anode to form CEI and SEI layers.

Therefore, the cathode film additive agent of MH-162 may form a polymer-type film in a radical polymerization method by an electrochemical reaction due to the vinyl double bond present at the end of the functional group. Therefore, when a stable and uniform film is preferentially formed on the surface of the electrode, other solvents are prevented from directly contacting the electrode, decomposition due to direct contact between the other solvent and the electrode is prevented, and thus undesired side reactions may be reduced.

In addition, the cathode film additive agent of MH-162 removes hydrogen fluoride (hereinafter HF), which is an acid component acting as a deteriorating factor in the electrolyte.

In other words, many commercially available lithium-ion batteries use $LiPF_6$ lithium salt-based electrolytes with good versatility. The fatal problem of $LiPF_6$ lithium salts is that the $LiPF_6$ lithium salt is vulnerable to moisture and has a hydrolysis reaction even with a small amount of moisture to form HF continuously.

When HF is formed in the lithium-ion battery, a solvent of the electrolyte is attacked and decomposed, and an interface between the electrode and the electrolyte is attacked to change a $Li_2CO_3$ component into LiF, thereby exposing an active surface to form gas.

On the other hand, silicon, which is an element present in a silyl ether (Si—O) functional group, is known to have a very strong affinity with fluorine, and thus is widely used as a functional group for removing HF from a lithium-ion battery. In particular, a functional group of trimethylsilyl group known as TMS is mainly used among them, and (4-allyl-2-methoxyphenoxy)trimethylsilane (MH-162) used as a cathode film additive agent in this embodiment also has a functional group, and thus is effective in removing HF.

Figure 1:
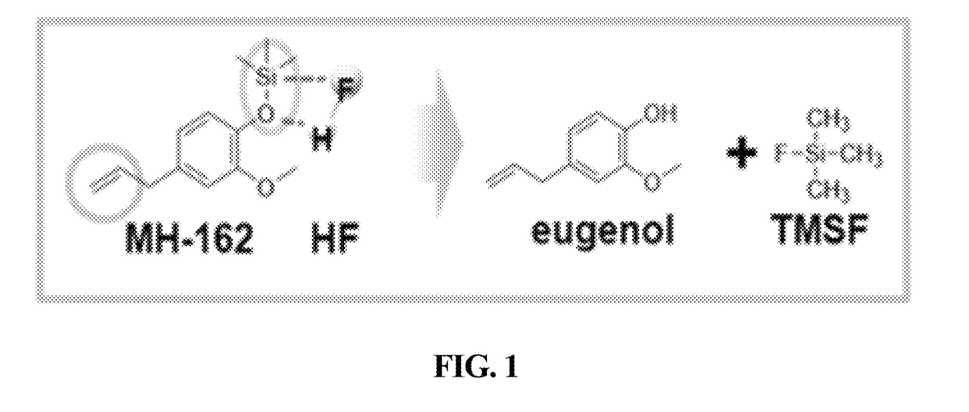
FIG. 1 is a view showing a reaction process in which HF is removed by a cathode film additive agent according to an embodiment of the present disclosure.

FIG. 1 is a view showing a reaction process in which HF is removed by the cathode film additive agent (MH-162) according to an embodiment of the present disclosure. It can be confirmed that fluorine (F) is removed by silicon (Si), which is an element present in the silyl ether (Si—O) functional group of the cathode film additive agent (MH-162), and hydrogen (H) is removed by oxygen (O).

On the other hand, the cathode film additive agent is preferably added in an amount of 0.1 wt % to 1.0 wt % based on the weight of the electrolyte. More preferably, the cathode film additive agent is added in an amount of 0.1 wt % to 0.5 wt % based on the weight of the electrolyte.

If the amount of the cathode film additive agent is less than 0.1 wt %, the cathode film additive agent is difficult to sufficiently form a surface protective film on the surfaces of the cathode active material and the anode active material, and thus the expected effect is insufficient. If the amount is more than 1.0 wt %, the surface protective layers CEI and SEI are excessively formed, resulting in a problem that the cell resistance increases, resulting in a decrease in cell lifespan.

On the other hand, the functional additive agent may further include an anode film additive agent serving to form a film on an anode together with the cathode film additive agent. For example, vinylene carbonate (hereinafter referred to as "VC") or $LiPO_2F_2$ may be used as an anode film additive agent.

At this time, it is preferable that VC used as the anode film additive agent is added in an amount of 0.5 to wt % 3.0 wt % based on the electrolyte weight. More preferably, the added amount of the anode film additive agent is 1.5 wt % to 2.5 wt %.

In addition, $LiPO_2F_2$ used as the anode film additive agent is preferably added in an amount of 0.1 wt % to 2.0 wt % based on the weight of the electrolyte.

If the added amount of the cathode film additive agent is less than the suggested amount, the long-term life characteristics of the cell have deteriorated. If the added amount of the cathode film additive agent is greater than the suggested amount, cell resistance may increase due to excessive formation of the surface protective layer, and thus battery output power may be degraded.

Next, a method for synthesizing (4-allyl-2-methoxyphenoxy)trimethylsilane (MH-162), which is a cathode film additive agent included in the electrolyte for a lithium secondary battery according to an embodiment of the present disclosure, will be described.

Figure 2:
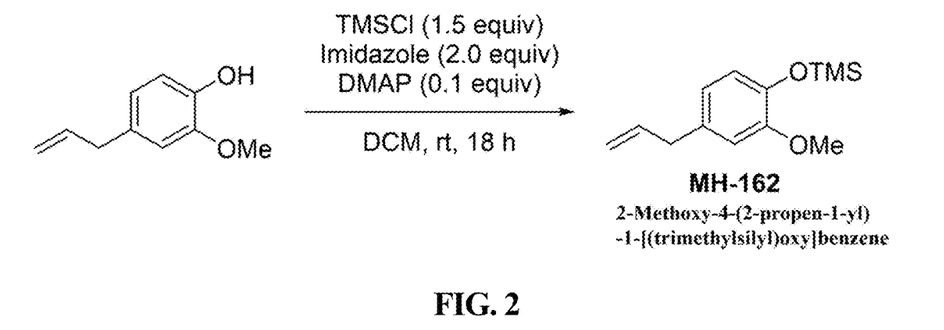
FIG. 2 is a view showing the process of synthesizing the cathode film additive agent according to an embodiment of the present disclosure.

FIG. 2 is a view showing a process of synthesizing the cathode film additive agent of the electrolyte for a lithium secondary battery according to an embodiment of the present disclosure.

As shown in FIG. 2, in order to synthesize (4-allyl-2-methoxyphenoxy)trimethylsilane (MH-162), which is the cathode film additive agent, first, one drop by one of 5.15 ml of trimethylsilyl chloride (40.58 mmol) is added at 0° C. to the mixture in which 3.68 g of imidazole (54.06 mmol), 4.41 ml of 4-allyl-2-methoxyphenol (28.46 mmol), and 330 mg of 4-dimethylaminopyridine (2.70 mmol) are dissolved in dichloromethane.

Then, after stirring the mixture at 80° C. for 12 hours, the organic solvent layer is extracted by using a saturated aqueous sodium bicarbonate solution once and a aqueous brine solution twice.

Subsequently, the extracted organic solution is dried using sodium sulfate and dried in a vacuum state after undergoing a filter process and a concentration process, thereby obtaining MH-162 in the form of a yellow oil (92% yield, 6.21 g).

On the other hand, according to an embodiment of the present disclosure, the lithium secondary battery composed of a cathode, an anode, and a separator together with the above-described electrolyte.

The cathode includes an NCM-based cathode active material made of Ni, Co, and Mn. In particular, it is preferable that the cathode active material included in the cathode in the present embodiment may be formed of only an NCM-based cathode active material containing 80 wt % or more of Ni.

The anode includes at least one anode active material selected from carbon (C)-based and silicon (Si)-based materials.

The carbon (C)-based anode active material may include at least one material selected from the group consisting of artificial graphite, natural graphite, graphitized carbon fiber, graphitized mesocarbon microbeads, fullerene, and amorphous carbon.

In addition, the silicon (Si)-based anode active material includes silicon oxide, silicon particles, silicon alloy particles, and the like.

On the other hand, the cathode and the anode are prepared by mixing a conductive material, a binder, and a solvent with each active material to prepare an electrode slurry and then directly coating and drying the electrode slurry on a current collector. In this case, aluminum (Al) may be used as a current collector but is not limited thereto. Since such an electrode manufacturing method is widely known in the art, a detailed description thereof will be omitted herein.

The binder serves to attach each active material particle to each other well or to attach each active material particle to the current collector well, the binder may include, for example, polyvinyl alcohol, carboxymethyl cellulose, hydroxypropyl cellulose, diacetyl cellulose, polyvinyl chloride, carboxylated polyvinyl chloride, polyvinyl fluoride, polymers containing ethylene oxide, polyvinylpyrrolidone, polyurethane, polytetrafluoroethylene, polyvinylidene fluoride, polyethylene, polypropylene, styrene-butadiene rubber, acrylated styrene butadiene rubber, epoxy resin, nylon, etc., but the present disclosure is not limited thereto.

In addition, the conductive material, used to impart conductivity to an electrode, does not cause chemical changes in a composed battery, and any electrically conductive material may be used, for example, metal powders and metal fiber such as natural graphite, artificial graphite, carbon black, acetylene black, Ketjen black, carbon fiber, copper, nickel, aluminum, silver, and the like, and the conductive material such as a polyphenylene derivative may be used alone or as a mixture of one or more.

The separator prevents a short circuit between the anode and the cathode and provides a movement path for lithium ions. As a separator, well-known material such as polypropylene, polyethylene, polyethylene/polypropylene, polyethylene/polypropylene/polyethylene, polyolefin-based polymer membranes such as polypropylene/polyethylene/polypropylene, or multilayers thereof, microporous films, woven fabrics, and nonwoven fabrics may also be used, a film coated with a resin having excellent stability on the porous polyolefin film may be used.

Hereinafter, the present disclosure will be described with reference to Examples and Comparative Examples of the present disclosure.

Experiment 1

Figure 3:
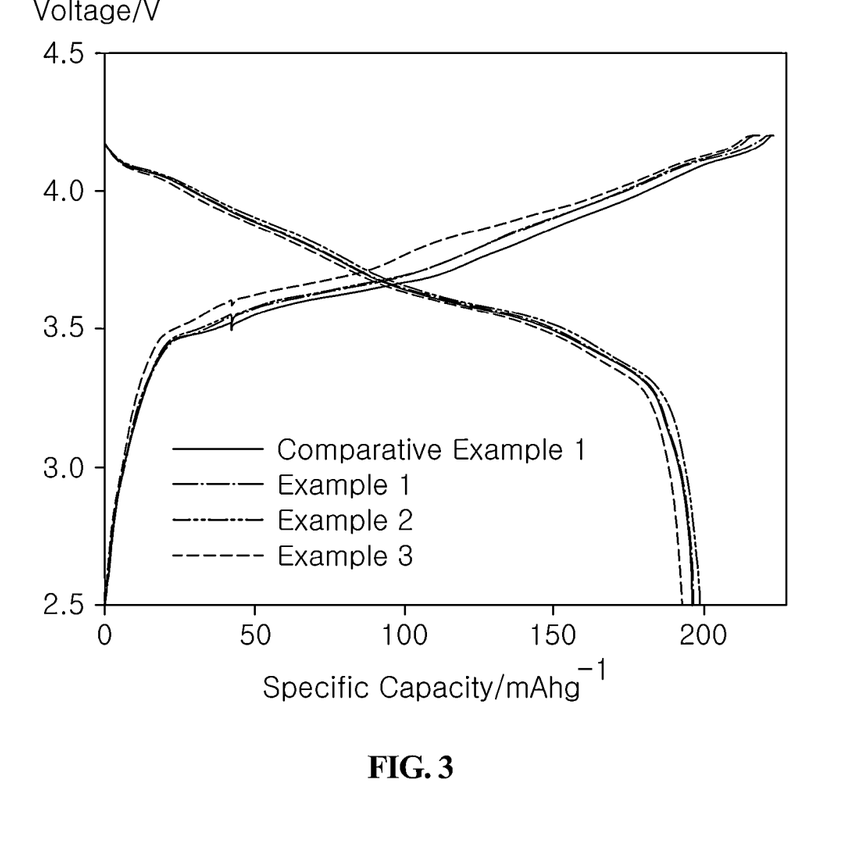
FIG. 3 is a graph showing the experimental results of evaluating a cell initial charge/discharge efficiency for each electrolyte composition according to Examples and Comparative Examples.
Figure 4:
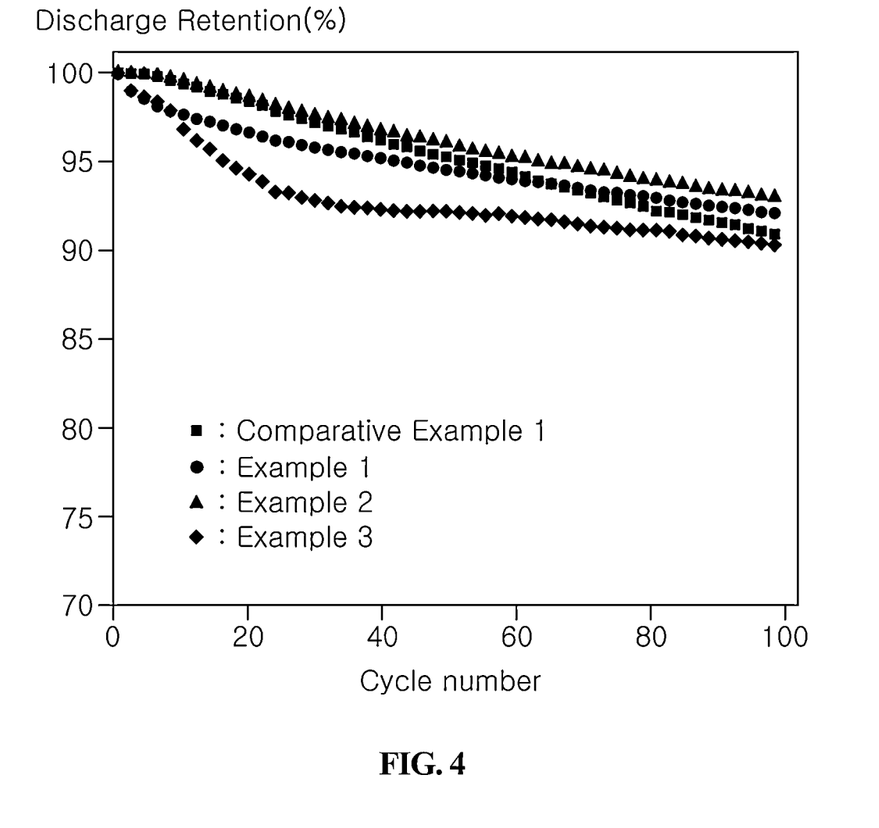
FIG. 4 is a graph showing the experimental results of evaluating the high-temperature lifespan for each electrolyte composition according to Examples and Comparative Examples.

Cell resistance and high-temperature lifespan characteristics test at high temperature (45° C.) according to the amount of the anode coating additive agent in the case of using graphite as the anode In the case of using graphite as the anode, in order to examine the cell resistance and high-temperature lifespan characteristics according to the amount of the cathode film additive agent added to the electrolyte, the initial cell resistance and the charge retention during 100 cycles of charging and discharging were measured at high temperature (45° C.) while changing the amount of MH-162 in the fixed state where the amount of the anode film additive agent VC added was fixed to 1.0 wt % as shown in Table 1 below, and the results are shown in Table 1 and FIGS. 3 and 4.

At this time, the cycle was performed at Cut-off: 2.5 to 4.2 V, C-rate: 1C, and temperature: 45° C., and as a lithium salt 0.5M $LiPF_6$ and 0.5M LiFSI were used to prepare the electrolyte, and as a solvent, ethylene carbonate (EC): ethyl methyl carbonate (EMC): diethyl carbonate (DEC) was mixed at a volume ratio of 25:45:30.

NCM811 was used as a cathode, and graphite was used as an anode.

TABLE 1

| Division | Additives (wt %) | | initial cell resistance (%) | High-temperature lifespan (%)@100 cyc |
|---|---|---|---|---|
| | VC | MH-162 | | |
| Comparative Example 1 | 1.0 | — | 87.9 | 90.8 |
| Example 1 | 1.0 | 0.1 | 90.5 | 91.9 |
| Example 2 | 1.0 | 0.5 | 89.3 | 92.8 |
| Example 3 | 1.0 | 1.0 | 88.3 | 90.2 |

FIG. 3 is a graph showing the experimental results of evaluating the cell initial charging and discharging efficiency for each electrolyte composition according to Examples and Comparative Examples, and FIG. 4 is a graph showing the experimental results of evaluating the high-temperature lifespan for each electrolyte composition according to Examples and Comparative Examples.

As shown in Table 1 and FIGS. 3 and 4, in the case of Examples 1 to 3 in which 0.1 wt %, 0.5 wt %, and 1.0 wt % of the cathode film additive agent (MH-162) according to the present disclosure were added, all of the initial cell resistance was improved compared to Comparative Example 1 in which the cathode film additive agent was not added to the electrolyte.

In addition, in terms of high-temperature lifespan, Examples 1 to 3 were similar or improved compared to Comparative Example 1, and in particular, Examples 1 and 2 were significantly improved in high-temperature lifespan compared to Comparative Example 1.

Experiment 2

Figure 5:
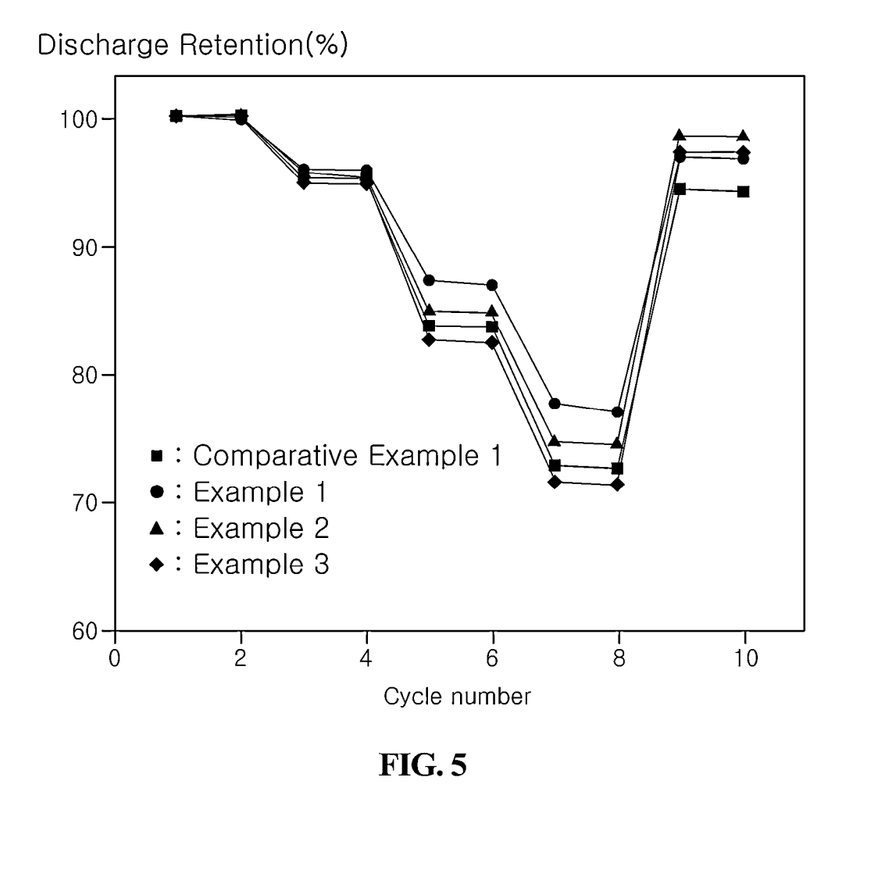
FIG. 5 is a graph showing the experimental results of evaluating the characteristics of each rate for each electrolyte composition according to Examples and Comparative Examples.

In the case of using graphite as an anode, an experiment on the characteristics of each rate at room temperature (25° C.) depending on the amount of the cathode film additive agent added In the case of using graphite as the anode, in order to examine the cell resistance and high-temperature life characteristics according to the amount of the cathode film additive agent added to the electrolyte, the characteristics of each rate were measured at room temperature (25° C.) while changing the amount of the cathode film additive agent MH-162 in the fixed state where the amount of the anode film additive agent VC added was fixed to 1.0 wt % as shown in Table 2 below, and the results are shown in Table 2 and FIG. 5.

At this time, the cycle was performed at Cut-off: 2.5 to 4.2 V, C-rate: 0.5C/1.0C/2.0C/3.0C/0.5C and temperature: 45° C., and as a lithium salt 0.5 M $LiPF_6$ and 0.5 M LiFSI were used to prepare the electrolyte, and as a solvent, ethylene carbonate (EC): ethyl methyl carbonate (EMC): diethyl carbonate (DEC) was mixed at a volume ratio of 25:45:30.

NCM811 was used as a cathode, and graphite was used as an anode.

TABLE 2

| Division | Additives (wt %) | | Each rate characteristic @3 C |
|---|---|---|---|
| | VC | MH-162 | |
| Comparative Example 1 | 1.0 | — | 72.6 |
| Example 1 | 1.0 | 0.1 | 77.0 |
| Example 2 | 1.0 | 0.5 | 74.5 |
| Example 3 | 1.0 | 1.0 | 71.5 |

FIG. 5 is a graph showing the experimental results of evaluating the characteristics of each rate for each electrolyte composition according to Examples and Comparative Examples.

As shown in Table 2 and FIG. 5, in the case of Examples 1 to 3 in which 0.1 wt %, 0.5 wt %, and 1.0 wt % of the cathode film additive agent (MH-162) according to the present disclosure were added, all of each rate characteristic was improved compared to Comparative Example 1 in which the cathode film additive agent was not added to the electrolyte.

Experiment 3

Figure 6:
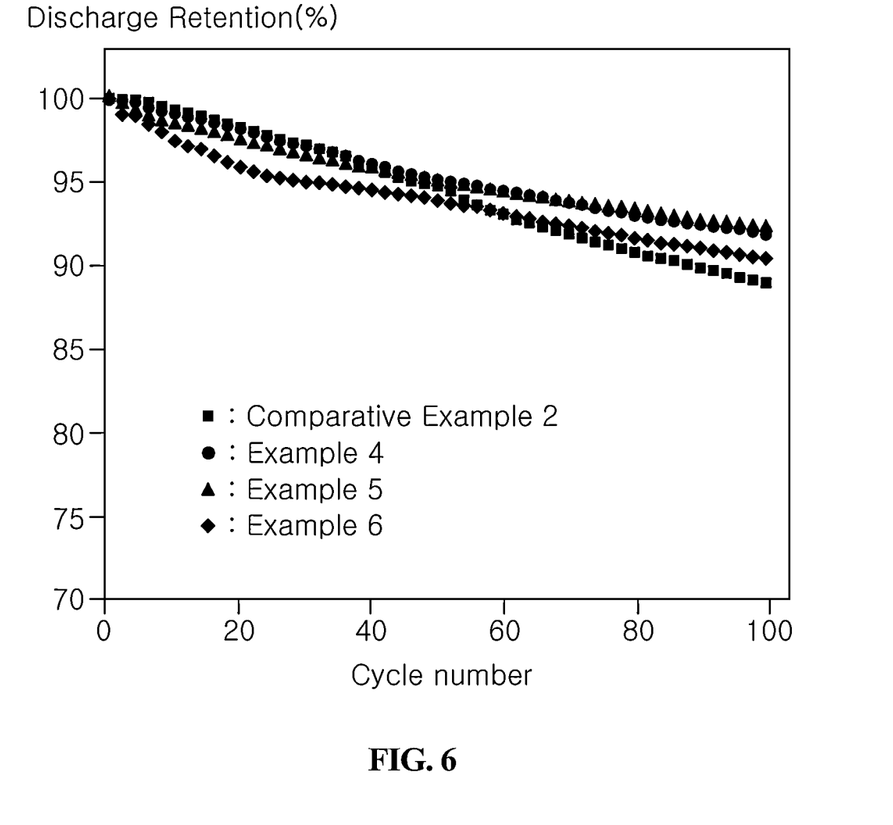
FIG. 6 is a graph showing the experimental results of evaluation of high-temperature lifespan for each electrolyte composition according to Examples and Comparative Examples.

In the case of using graphite as an anode, a high-temperature lifespan characteristic experiment at high temperature (45° C.) according to the amount of the cathode film additive agent added In the case of using graphite as the anode, in order to examine the cell resistance and high-temperature life characteristics according to the amount of the cathode film additive agent added to the electrolyte, the charge retention during 100 cycles of charging and discharging was measured at high temperature (45° C.) while changing the amount of MH-162 in the fixed state where the amount of functional additive agents VC and $LiPO_2F_2$ were fixed to 1.0 wt % and 0.5 wt %, respectively, and the results are shown in Table 3 and FIG. 6.

At this time, the cycle was performed at Cut-off: 2.5 to 4.2 V, C-rate: 1C, and temperature: 45° C., and as a lithium salt 0.5 M $LiPF_6$ and 0.5 M LiFSI were used to prepare the electrolyte, and as a solvent, ethylene carbonate (EC): ethyl methyl carbonate (EMC): diethyl carbonate (DEC) was mixed at a volume ratio of 25:45:30.

NCM811 was used as a cathode, and graphite was used as an anode.

TABLE 3

| Division | Additives (wt %) | | | High-temperature lifespan (%)@100 cyc |
|---|---|---|---|---|
| | VC | $LiPO_2F_2$ | MH-162 | |
| Comparative Example 2 | 1.0 | 0.5 | — | 88.9 |
| Example 4 | 1.0 | 0.5 | 0.1 | 91.9 |

TABLE 3-continued

| Division | Additives (wt %) VC | Additives (wt %) LiPO$_2$F$_2$ | Additives (wt %) MH-162 | High-temperature lifespan (%)@100 cyc |
|---|---|---|---|---|
| Example 5 | 1.0 | 0.5 | 0.5 | 92.2 |
| Example 6 | 1.0 | 0.5 | 1.0 | 90.3 |

FIG. 6 is a graph showing the experimental results of an evaluation of high-temperature lifespan for each electrolyte composition according to Examples and Comparative Examples.

As shown in Table 3 and FIG. 6, in the case of Examples 4 to 6 in which 0.1 wt %, 0.5 wt %, and 1.0 wt % of the cathode film additive agent (MH-162) according to the present disclosure were added, all of the high-temperature lifespans was improved compared to Comparative Example 2 in which the cathode film additive agent was not added to the electrolyte. In particular, it was confirmed that Examples 4 and 5 were significantly improved in high-temperature lifespan compared to Comparative Example 2.

Therefore, as can be seen from the above experiments, in terms of the initial cell resistance, high-temperature lifespan characteristics, and each rate characteristic, it was confirmed that the addition of the cathode film additive agent (MH-162) is presented in the present disclosure in an amount of 0.1 wt % to 1.0 wt %, more desirably 0.1 wt % to 0.5 wt %, was superior to the case where the cathode film additive agent (MH-162) proposed in this disclosure was not added.

Although the present disclosure has been described with reference to the accompanying drawings and the above-described preferred embodiment, the present disclosure is not limited thereto and is limited to the following claims. Accordingly, those of ordinary skilled in the art can variously change and modify the present disclosure within the scope without departing from the spirit of the claims to be described later.

What is claimed is:

1. An electrolyte solution for a lithium secondary battery, the electrolyte solution comprising an electrolyte comprising a lithium salt, a solvent, and a functional additive agent, wherein the functional additive agent comprises a cathode film additive agent in an amount of 0.1% to 1.0% by weight with respect to a weight of the electrolyte, the cathode film additive agent is (4-allyl-2-methoxyphenoxy)trimethylsilane represented by the following formula:

2. The electrolyte solution of claim 1, wherein the cathode film additive agent is contained in an amount of 0.1% to 0.5% by weight with respect to a weight of the electrolyte.

3. The electrolyte solution of claim 1, wherein the lithium salt is one or a mixture of two or more selected from the group consisting of LiPF$_6$, LiBF$_4$, LiClO$_4$, LiCl, LiBr, LiI, LiB$_{10}$Cl$_{10}$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiN(SO$_2$C$_2$F$_5$)$_2$, Li(CF$_3$SO$_2$)$_2$N, LiC$_4$F$_9$SO$_3$, LiB(C$_6$H$_5$)$_4$, Li(SO$_2$F)$_2$N (LiFSI), and (CF$_3$SO$_2$)$_2$NLi.

4. The electrolyte solution of claim 1, wherein the solvent is one or a mixture of two or more selected from the group consisting of a carbonate-based solvent, an ester-based solvent, an ether-based solvent, or a ketone-based solvent.

5. The electrolyte solution of claim 4, wherein the carbonate-based solvent is a material of ethylene carbonate (EC), ethyl methyl carbonate (EMC), or diethyl carbonate (DEC).

6. The electrolyte solution of claim 1, wherein the functional additive agent further comprises vinylene carbonate (VC) as an anode film additive agent, wherein the vinylene carbonate (VC) is added in an amount of 0.5% to 3.0% by weight with respect to a weight of the electrolyte.

7. The electrolyte solution of claim 1, wherein the functional additive agent further comprises LiPO$_2$F$_2$ as an anode film additive agent, wherein the LiPO$_2$F$_2$ is added in an amount of 0.1% to 2.0% by weight with respect to a weight of the electrolyte.

8. A lithium secondary battery comprising a cathode, an anode, and an electrolyte solution comprising an electrolyte comprising a lithium salt, a solvent, and a functional additive agent, wherein the functional additive agent comprises a cathode film additive agent in an amount of 0.1% to 1.0% by weight with respect to a weight of the electrolyte, the cathode film additive agent is (4-allyl-2-methoxyphenoxy)trimethylsilane represented by the following formula:

9. The lithium secondary battery of claim 8, wherein:
the cathode comprises a cathode active material comprising lithium, nickel, manganese, and cobalt oxide;
the anode comprises an anode active material comprising carbon-based materials or silicon-based materials; and
a separator interposed between the cathode and the anode.

10. The lithium secondary battery of claim 9, wherein the cathode active material comprises 80% by weight or more of nickel (Ni).

11. The lithium secondary battery of claim 9, wherein the anode active material is graphite.

* * * * *